US011722208B1

(12) United States Patent
Marupaduga et al.

(10) Patent No.: US 11,722,208 B1
(45) Date of Patent: Aug. 8, 2023

(54) SCHEDULING RESOURCES FOR RELAY NODES IN A WIRELESS NETWORK

(71) Applicant: SPRINT SPECTRUM LP, Overland Park, KS (US)

(72) Inventors: Sreekar Marupaduga, Overland Park, KS (US); Nitesh Manchanda, Overland Park, KS (US); Vanil Parihar, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 463 days.

(21) Appl. No.: 16/923,479

(22) Filed: Jul. 8, 2020

Related U.S. Application Data

(62) Division of application No. 15/791,838, filed on Oct. 24, 2017, now Pat. No. 10,749,592.

(51) Int. Cl.
*H04B 7/155* (2006.01)
*H04W 72/04* (2023.01)

(52) U.S. Cl.
CPC ........ *H04B 7/15542* (2013.01); *H04W 72/04* (2013.01)

(58) Field of Classification Search
CPC .......................... H04B 7/15542; H04W 72/04
See application file for complete search history.

(56) References Cited

U.S. PATENT DOCUMENTS

| 9,265,053 | B2 | 2/2016 | Blankenship et al. | |
| 10,749,592 | B1* | 8/2020 | Marupaduga | ......... H04W 72/04 |
| 2009/0016290 | A1 | 1/2009 | Chion et al. | |
| 2009/0203309 | A1* | 8/2009 | Okuda | ............... H04B 7/15542 455/7 |
| 2010/0254301 | A1* | 10/2010 | Blankenship | ....... H04W 72/542 370/329 |
| 2011/0268015 | A1* | 11/2011 | Xiao | .................... H04B 1/3822 370/315 |
| 2012/0093059 | A1* | 4/2012 | Bai | ....................... H04L 5/0007 370/312 |
| 2012/0149296 | A1* | 6/2012 | Sawai | .................. H04B 7/2606 455/7 |
| 2012/0207081 | A1 | 8/2012 | Cho et al. | |
| 2013/0039261 | A1 | 2/2013 | Bi et al. | |
| 2013/0090055 | A1* | 4/2013 | Pitakdumrongkija | ... H04B 7/15 455/9 |
| 2013/0336197 | A1 | 12/2013 | Park et al. | |
| 2015/0131537 | A1 | 5/2015 | Chiang et al. | |
| 2015/0327265 | A1* | 11/2015 | Lee | ..................... H04W 72/541 370/315 |
| 2016/0205695 | A1* | 7/2016 | Kishiyama | .......... H04W 52/243 370/315 |

FOREIGN PATENT DOCUMENTS

WO WO-2012064251 A1 * 5/2012 ............ H04W 52/34

* cited by examiner

*Primary Examiner* — Chi H Pham
*Assistant Examiner* — Weibin Huang
(74) *Attorney, Agent, or Firm* — Jones Robb, PLLC (57) ABSTRACT

Systems, methods, and processing nodes for scheduling resources for relay nodes in a wireless network include identifying a relay node attached to an access node in the wireless network, determining a transmit power associated with the relay node, and prioritizing resources allocated towards the relay node based on the transmit power. The transmit power includes a transmit power of a radio air interface deployed by the relay node.

20 Claims, 8 Drawing Sheets

SCHEDULING RESOURCES FOR RELAY NODES IN A WIRELESS NETWORK

This patent application is a divisional of U.S. patent application Ser. No. 15/791,838, filed on Oct. 24, 2017, which is incorporated by reference in its entirety for all purposes.

TECHNICAL BACKGROUND

Wireless networks incorporating access nodes, relay nodes, and other small-cell access nodes are becoming increasingly common, and may be referred to as heterogeneous networks. Relay nodes improve service quality by relaying communication between an access node, and end-user wireless devices in the wireless network. For example, relay nodes may be used at the edge of a coverage area of an access node to improve coverage and/or service, as well as in crowded areas having a high number of other wireless devices to increase the available throughput to the end-user wireless devices being relayed. Relay nodes are generally configured to communicate with the access node (i.e. a "donor" access node) via a wireless backhaul connection, and to deploy a radio air-interface to which end-user wireless devices can attach. Donor access nodes generally comprise scheduling modules for scheduling resources to wireless devices connected thereto, as well as to the wireless backhaul connections for the various relay nodes connected thereto.

However, variations in type of relay nodes, and/or resource usage thereof by end-user wireless devices, may not be efficiently accounted for by a donor access node. For example, different relay nodes are configured to deploy their respective wireless air-interfaces using different transmit powers, which results in varying numbers of end-user wireless devices that attach thereto, which can alter the resource usage of each relay node differently. These (and other) variations in resource requirements between differently-configured relay nodes can result in sub-optimal allocation of resources for the respective backhaul connections of each relay node, thereby affecting the quality of service delivered to end-user wireless devices connected thereto.

OVERVIEW

Exemplary embodiments described herein include systems, methods, and processing nodes for. An exemplary system described herein for scheduling resources for relay nodes in a wireless network includes an access node configured to deploy a first radio air interface, one or more relay nodes configured to attach to the first radio air interface and to deploy a second radio air interface to which one or more end-user wireless devices are attached, and a processing node communicably coupled to the access node. The processing node is configured to perform operations including determining a configuration of each of the one or more relay nodes attached to the first radio air interface, and scheduling resources towards each of the one or more relay nodes based on the configuration of each of the one or more relay nodes.

An exemplary method described herein for scheduling resources for relay nodes in a wireless network includes identifying a relay node attached to an access node in the wireless network, determining a transmit power associated with the relay node, and prioritizing resources allocated towards the relay node based on the transmit power. The transmit power includes a transmit power of a radio air interface deployed by the relay node.

An exemplary processing node described herein for scheduling resources for relay nodes in a wireless network is configured to perform operations including identifying one or more high-powered relay nodes in the wireless network, monitoring a resource requirement of a wireless air interface deployed by each of the high-powered relay nodes, and adjusting a priority of resources allocated towards said each of the one or more high-powered relay nodes based on the resource requirement.

DETAILED DESCRIPTION

Exemplary embodiments described herein include systems, methods, and processing nodes for scheduling resources towards wireless backhaul connections for relay nodes based on a configuration of said relay nodes. An exemplary system described herein includes at least a donor access node, such as an eNodeB, and a relay node in wireless communication with the donor access node. The relay node is configured to relay data packets between the donor access node and an end-user wireless device attached to the relay node. For the purposes of this disclosure, a relay node generally comprises a first component for communicating with the donor access node via a wireless backhaul connection (hereinafter, "backhaul") and a second component for deploying a wireless air-interface to which end-user wireless devices can attach and access network services from the donor access node. For example, the first component may comprise a wireless device for communicating via the backhaul (hereinafter, "relay wireless device") that is coupled with a small-cell access node (hereinafter "relay access point") to which the end-user wireless devices may attach. Alternatively, the first and second components may be combined into a single relay node device. A "configuration" of a relay node can therefore include differences in both first and second components.

For example, a configuration of a relay node may comprise a transmit power level of a second component of the relay node. In exemplary embodiments described herein, relay access points of different relay nodes may be configured to deploy the respective wireless air interface using different transmit powers. For example, an access point of a first relay node may utilize a transmit power of approximately 40 W, whereas an access point of a second relay node may utilize a transmit power of approximately 20 W. Other configurations of access points are possible. For example, an access point comprising a microcell or femtocell generally utilizes a transmit power of approximately 10 W-20 W, and an access point comprising a picocell or home eNodeB device generally utilizes a transmit power of approximately 1 W-5 W. In either case, differences in the coverage area of differently-configured relay nodes can result in different bandwidth or throughput requirements associated with the respective backhaul of each relay node. Thus, exemplary embodiments further described herein perform operations comprising determining a configuration of a relay node, and scheduling resources towards the backhaul of the relay node based thereon.

The configuration of a relay node can further include a device capability of the first component of the relay node (e.g. the relay wireless device). For example, the relay wireless device may be assigned to a high power class, which enables additional bandwidth and range for the backhaul connection. The configuration of a relay node can further include a priority level. The priority level may be associated with the relay node (i.e. either one or both of the first component or the second component), or may be associated with the end-user wireless devices connected thereto. The priority level may further be associated with a bearer utilized by the relay wireless device or end-user wireless devices. In either case, resources are scheduled towards the backhaul connection differently configured relay nodes based on the different configurations described herein.

In an exemplary embodiment, resources are scheduled with higher priority on the backhaul connection of a relay node that uses a higher transmit power for its associated wireless air-interface. In another exemplary embodiment, resources are scheduled with higher priority on the backhaul connection of a relay node that is serving a threshold number of end-user wireless devices, or that is serving end-user wireless devices having resource requirements that meet or exceed a threshold amount. In another exemplary embodiment, resources are scheduled with higher priority for relay nodes that are both 1) utilizing a high transmit power and 2) serving end-user wireless devices that exceed either a threshold number of devices or that requires a threshold amount of resources. For example, a relay node that is configured to utilize a standard transmit power may not be capable of adequately serving a threshold (or greater-than-threshold) number of end-user wireless devices and, thus, such a relay node would not benefit from a more robust backhaul.

In other exemplary embodiments, resources are scheduled with higher priority for relay nodes comprising high-powered wireless devices, relay wireless devices having a high priority or associated with a high-priority bearer, or relay nodes serving high-priority end-user wireless devices or end-user wireless devices associated with a high-priority bearer. Further, in addition to the systems and methods described herein, these operations may be implemented as computer-readable instructions or methods, and processing nodes on the network for executing the instructions or methods. For example, a processing node coupled to a donor access node, a scheduler within the donor access node, or a controller node may be configured to perform the operations described herein. These and other embodiments are further described with reference to FIGS. 1-8.

Figure 1:
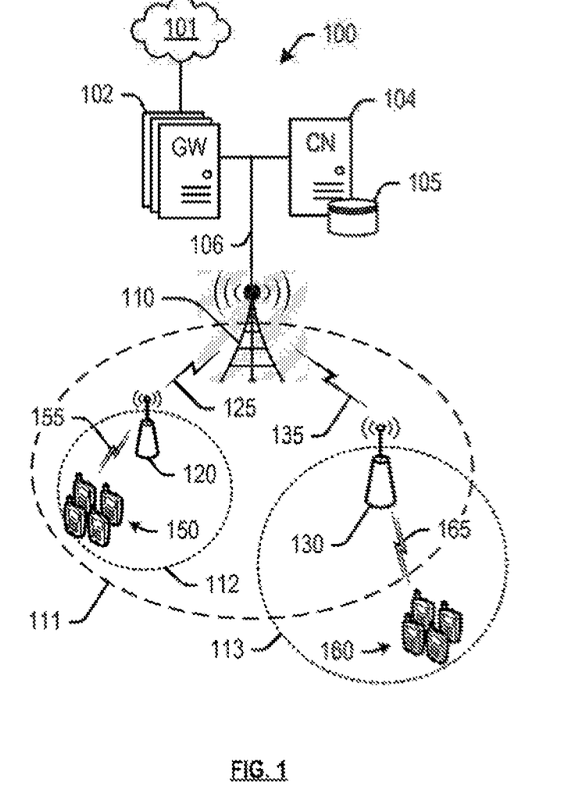
FIG. 1 depicts an exemplary system for scheduling resources for relay nodes in a wireless network.

FIG. 1 depicts an exemplary system for scheduling resources for relay nodes in a wireless network. System 100 comprises a communication network 101, gateway 102, controller node 104, access node 110, relay nodes 120 and 130, and end-user wireless devices 150 and 160. In this exemplary embodiment, access node 110 may be a macrocell access node configured to deploy a wireless air interface over a coverage area 111. Further, each of relay nodes 120, 130 may be configured to communicate with access node 110 over communication links 125, 135 respectively (hereinafter, "wireless backhaul" or simply "backhaul"), and are further configured to deploy additional wireless air interfaces over coverage areas 112, 113 respectively. Wireless devices 150 are configured to attach to the wireless air interface of relay node 120, and wireless devices 160 are configured to attach to the wireless air interface of relay node 130. Further, wireless devices 150, 160 may access network services using the combination of relay nodes 120, 130 and wireless backhaul links 125, 135, rather than directly connecting to (and potentially overloading) access node 110. Moreover, wireless devices 160 that are illustrated as being outside coverage area 111 of access node 110 may access network services from access node 110 by virtue of being connected to relay node 130. Consequently, access node 110 may be termed a "donor" access node. In other embodiments, any other combination of donor access nodes, relay access nodes, and carriers deployed therefrom may be evident to those having ordinary skill in the art in light of this disclosure.

Further, as described herein, a processing node communicatively coupled to access node 110, controller node 104, or any other network node, may be configured to schedule resources towards backhauls 125, 135 based on a configuration of each of relay nodes 120, 130 respectively. The configuration of each relay node 120, 130 may comprise a transmit power level used to deploy a wireless air interface of each relay node 120, 130. In this embodiment, relay node 130 is illustrated as utilizing a higher transmit power than relay node 120. For example, relay node 130 may utilize a transmit power of approximately 40W, whereas relay node 120 may utilize a transmit power of approximately 20W. Other configurations of transmit power may be evident to those having ordinary skill in the art, such as microcells or femtocells utilizing a transmit power of approximately 10W-20W, and picocells or home eNodeB devices utilizing a transmit power of approximately 1W-5W. In either case, differences in the coverage area of differently-configured relay nodes can result in different bandwidth or throughput requirements associated with the respective backhaul of each relay node. Consequently, in this exemplary embodiment, coverage area 113 is illustrated as being larger than coverage area 112.

Thus, operations performed by system 100 include scheduling resources towards each of backhauls 125, 135 based on the configuration of each relay node 120, 130 respectively. For example, resources are scheduled with higher priority on backhaul connection 135 of relay node 130 that uses the higher transmit power for its associated wireless air-interface. For example, resources are scheduled with higher priority on backhaul connection 135 if a number of wireless devices 160 meets or exceeds a threshold number, or if a resource requirement of wireless devices 160 meets or exceeds a threshold requirement. In other words, resources are scheduled with higher priority for relay nodes that are both 1) utilizing a high transmit power and 2) serving end-user wireless devices that exceed either a threshold number of devices or that requires a threshold amount of resources. On the other hand, relay node 120 that is configured to utilize a standard transmit power may not be capable of adequately serving a threshold (or greater-than-threshold) number of end-user wireless devices and, thus, backhaul 125 is assigned a standard or default priority.

In other exemplary embodiments, resources are scheduled with higher priority for relay nodes comprising high-powered wireless devices, relay wireless devices having a high priority or associated with a high-priority bearer, or relay nodes serving high-priority end-user wireless devices or end-user wireless devices associated with a high-priority bearer. For example, the configuration of a relay node can further include a device capability of a relay wireless device, as further described herein. The configuration of a relay node can further include a priority level. The priority level may be associated with the relay node, or may be associated with the end-user wireless devices connected thereto. The priority level may further be associated with a bearer utilized by the relay wireless device or end-user wireless devices. For example, access node 110 and/or relay nodes 120, 130 may each be configured to mark a data packet associated with an end-user wireless device using a unique identifier or QCI radio bearer, and to recognize the data packet based on the unique identifier or the bearer. For end-user wireless devices that are receiving or transmitting packets with a specific QCI radio bearer, the priority of resources allocated towards the respective backhaul may be adjusted accordingly. Further, prioritizing resources allocated towards a backhaul can include allocating additional resources towards a backhaul, increasing a modulation or coding scheme associated with the backhaul, or any other method of increasing a throughput and/or quality of service QoS associated with the backhaul.

Access node 110 can be any network node configured to provide communication between end-user wireless devices 150, 160 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area 111 in the range of approximately five kilometers to thirty-five kilometers and an output power in the tens of watts. Further relay nodes 120, 130 may comprise any short range, low power, small-cell access nodes such as a microcell access node, a picocell access node, a femtocell access node, or a home eNodeB device. In addition, relay nodes 120, 130 may comprise a small-cell access node paired with a relay wireless device configured to communicate over one of backhauls 125, 135 respectively.

Access node 110 and relay nodes 120, 130 can each comprise a processor and associated circuitry to execute or direct the execution of computer-readable instructions to perform operations such as those further described herein. Briefly, access node 110 and relay nodes 120, 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay nodes 120, 130 can receive instructions and other input at a user interface. Access node 110 communicates with gateway node 102 and controller node 104 via communication links 106, 107. Access node 110 and relay nodes 120, 130 may communicate with each other, and other access nodes (not shown), using a wireless link or a wired link such as an X2 link. Components of exemplary access nodes 110 and relay nodes 120, 130 are further described with reference to FIGS. 2-4.

Wireless devices 150, 160 may be any device, system, combination of devices, or other such communication platform capable of communicating wirelessly with access node 110 and/or relay nodes 120, 130 using one or more frequency bands deployed therefrom. Each of wireless devices 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150, 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of relay nodes 120, 130, resource requirements of end-user wireless devices 150, 160, priority levels associated therewith, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
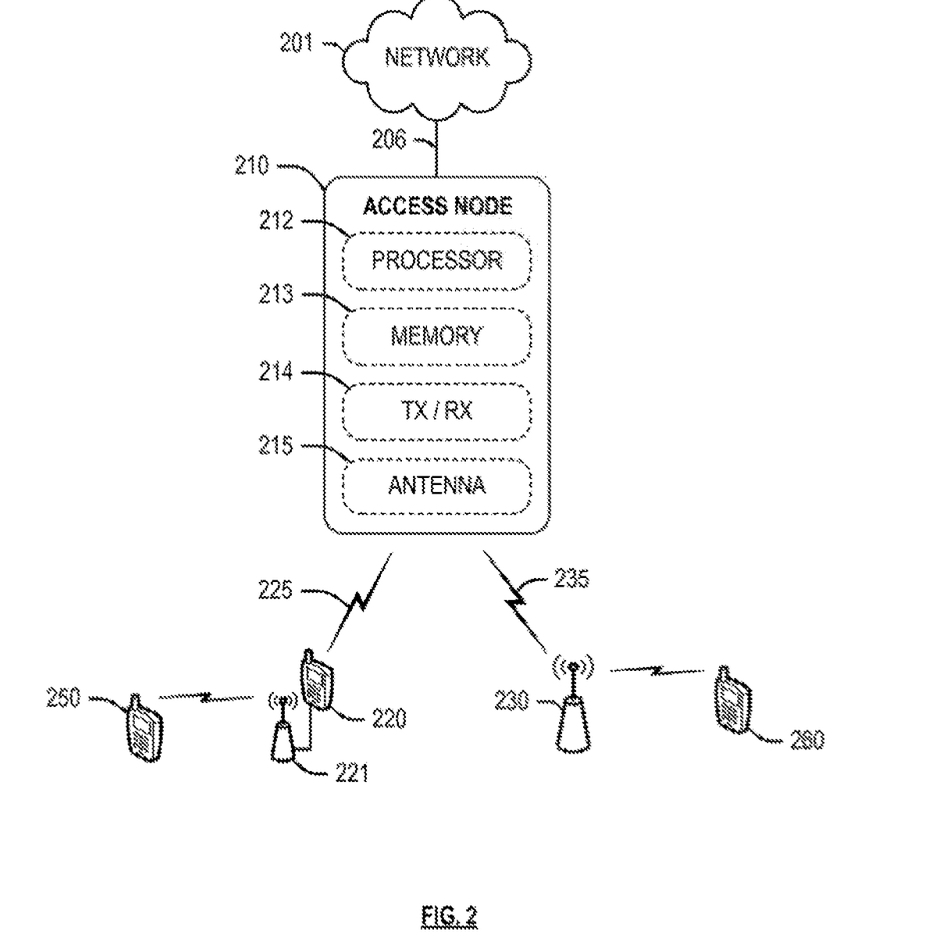
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 212, memory 213, transceiver 214, and antenna 215. Processor 212 executes instructions stored on memory 213, while transceiver 214 and antenna 215 enable wireless communication with relay wireless device 220 and relay node 230. Instructions stored on memory 213 can include deploying a wireless air interface via combination of transceiver 214 and antenna 215, enabling relay wireless device 220 and relay node 230 to access network services from network 201 via access node 210, and to communicate with end-user wireless devices 250, 260 via relay wireless device 220, relay access point 221, and relay node 230, respectively. Thus, access node 210 may be referred to as a donor access node. Further, according to this embodiment, relay wireless device 220 is configured as a first component and access point 221 is configured as a second component, such that a combination of the first component and the second component comprises a relay node. On the other hand, relay node 230 may incorporate both first and second components into a single structure.

In either case, access node 210 may further be configured to identify relay wireless device 220 and relay node 230 connected thereto, determine a configuration thereof, and schedule resources towards backhauls 225 and 235 based thereon. For example, the configuration of each of relay node may comprise a transmit power level of each second component, i.e. access point 221 and relay node 230. Upon determining that one or both of access point 221 or relay node 230 is configured to utilize a transmit power that meets a threshold transmit power, a priority of one or both of backhauls 225, 235 may be increased, respectively. For example, the priority of a backhaul may be increased upon determining that a number of end-user wireless devices (such as wireless devices 250, 260) attached to a radio air interface deployed by one or both of access point 221 and relay node 230 meets a threshold number. Alternatively or in addition, the priority of a backhaul may be increased upon determining that a resource requirement of end-user wireless devices (such as wireless devices 250, 260) attached to a radio air interface deployed by one or both of access point 221 and relay node 230 meets a threshold amount. The configuration of relay nodes attached to access node 210, as well as numbers and requirements of end-user wireless devices attached thereto, may be monitored on an ongoing basis, and adjustments to priority and amount of resources allocated towards backhauls 225, 235 performed in real-time.

Figure 3:
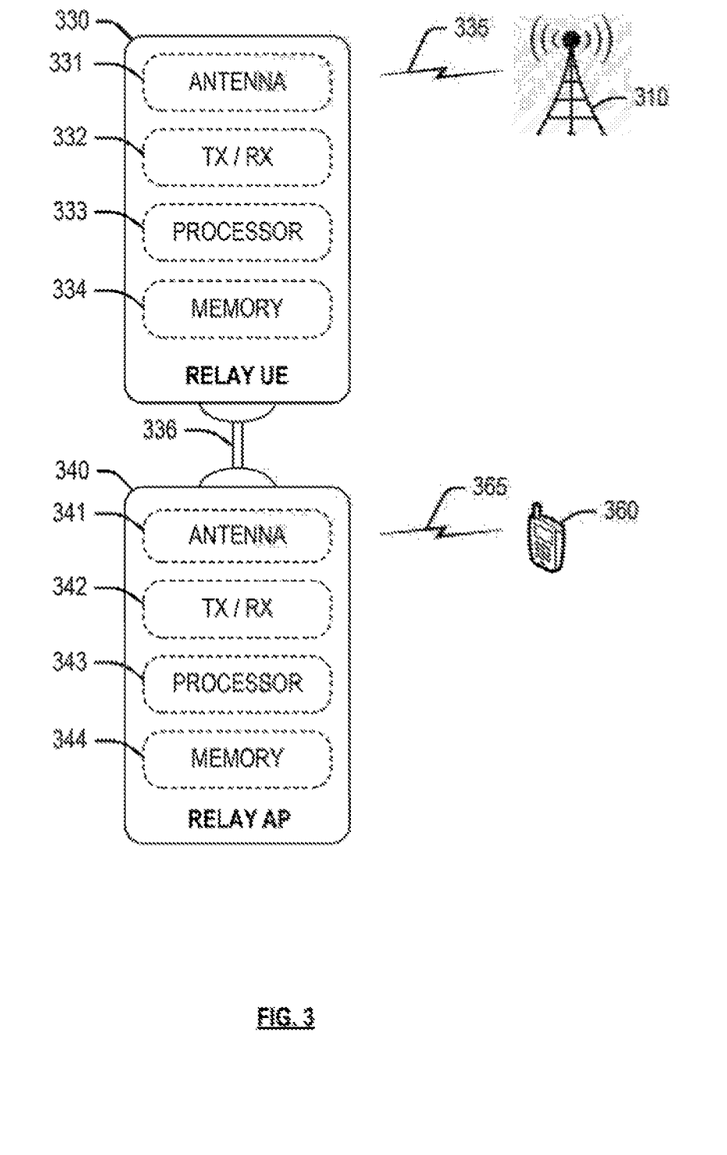
FIG. 3 depicts an exemplary relay node comprising a relay wireless device and a relay access point.

FIG. 3 depicts an exemplary relay node comprising a relay wireless device (relay UE) 330 and a relay access point (relay AP) 340. Relay wireless device 330 is illustrated as comprising an antenna 331 for direct (i.e. unrelayed) communication with donor access node 310 via wireless backhaul link 335, a transceiver 332, a processor 333, and a memory 334 for storing instructions that enable relay wireless device 330 to perform operations described herein. In some embodiments, relay wireless device 330 is referred to as a customer premise equipment (CPE), which includes any stationary LTE wireless device having a stronger computational & RF capability versus standard wireless devices, as well as a directional antenna and a dedicated power supply, enabling relay wireless device 330 to efficiently provide resources to wireless device 360 via relay access point 340.

Consequently, relay access point 340 may be co-located with relay wireless device 330, and is connected to relay wireless device 330 via a communication interface 336. Communication interface 336 may be any interface that enables direct communication between relay wireless device 330 and relay access point 340, such as USB, FireWire, Ethernet, or any other serial, parallel, analog, or digital interface.

In operation, relay wireless device 330 may be configured to relay network services from donor access node 310 to wireless device 360 via relay access point 340. Relay wireless device 330 may begin to function as a relay wireless device by sending a message to donor access node 310 to indicate to donor access node 310 that wireless device 330 is functioning as a relay wireless device. In some embodiments, relay wireless device 330 can request to send a buffer status report to donor access node 310. Donor access node 310 can grant this request in a conventional manner. Relay wireless device 330 may respond to the grant by sending a short buffer status report. This short buffer status report is associated with a logical channel group that indicates the buffer status report is communicating the status of relay wireless device 330 as a relay, and thus is not asking for additional resource allocations (like a 'conventional' buffer status report would indicate). In other words, when relay wireless device 330 responds with a buffer status report for the 'special' logical channel group, it means that the buffer status report is not actually reporting the status of a buffer. Rather, this buffer status report indicates that the wireless device is now functioning as a relay. Once status of relay wireless device 330 is established, relay wireless device 330 may instruct relay access point 340 to start accepting connection requests from one or more wireless devices such as wireless device 360.

Further, based on the indication of relay status, donor access node 310 may alter how relay wireless device 330 is treated. For example, relay wireless device 330 may be provided with preferential treatment because it is functioning as a relay. In an exemplary embodiment, a specific class indicator is assigned to wireless backhaul link 335 between relay wireless device 330 and donor access node 310. The class indicator may be a QCI that is different from other QCIs assigned to wireless devices that are directly connected to donor access node 310. In other embodiments (and as described herein), upon determining that a resource requirement or traffic type of wireless device 360 meets a threshold or other criteria, the class indicator of wireless backhaul link 335 can be adjusted to meet the resource requirement or provide an appropriate QoS for the traffic type.

In another exemplary embodiment, relay wireless device 330 transmits a device capability to donor access node 310, which includes a power class assigned to relay wireless device 330. The device capability may be transmitted, for example, when relay wireless device 330 transmits an attach request to donor access node 310. Upon determining that the power class of relay wireless device 330 comprises a high power class, donor access node 310 may prioritize (or allocate additional) resources towards backhaul 335. Alternatively or on addition, upon determining that the power class of relay wireless device 330 comprises a high power class, donor access node 310 may begin monitoring a number of end-user wireless devices (such as end-user wireless device 360) as well as resource requirements thereof, and trigger the prioritizing upon determining that a threshold is reached.

Relay access point 340 is illustrated as comprising an antenna 341 and transceiver 342 for enabling communication with wireless device 360, processor 343, and a memory 344 for storing instructions that are executed by processor 343. In some embodiments, relay access point 340 may be a home eNodeB. Moreover, although only one transceiver is depicted in each of relay wireless device 330 and relay access point 340, additional transceivers may be incorporated in order to facilitate communication across interface 326 and other network elements. In operation, relay access point 340 may be configured to deploy a carrier by combination of antenna 341 and transceiver 342, and enabling wireless device 360 to attach thereto. Further, via relay wireless device 330, relay access point 340 may be configured to transmit an indicator of its transmit power to donor access node 310. Upon determining that the transmit power of relay access point 340 is higher than a threshold, donor access node 310 may prioritize (or allocate additional) resources towards backhaul 335. Alternatively or on addition, upon determining that the transmit power of relay access point 340 is higher than the threshold, donor access node 310 may begin monitoring a number of end-user wireless devices (such as end-user wireless device 360) as well as resource requirements thereof, and trigger the prioritizing upon determining that a threshold is reached.

Figure 4:
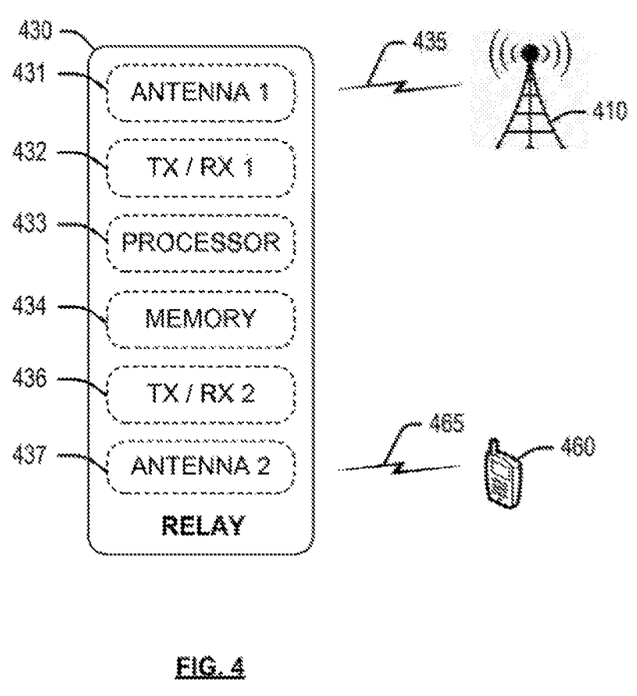
FIG. 4 depicts another exemplary relay node.

In another exemplary embodiment, a relay access node may integrate components of both a relay wireless device and a relay access point into a single unit. FIG. 4 depicts another exemplary relay node 430 according to this configuration. Relay node 430 is illustrated as comprising an antenna 431 for direct (i.e. unrelayed) communication with donor access node 410 via wireless backhaul link 435, a transceiver 432, a processor 433, and a memory 434 for storing instructions that are executed by processor 422 as described herein. Relay node 430 further includes another transceiver 436 and antenna 437 for enabling communication with wireless device 460. Relay access node 420 can perform operations similar to those described with respect to FIG. 3.

In an embodiment, the relay nodes depicted in FIG. 3-4 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/re-assembly). In other words, relay node depicted herein performs demodulation and decoding of the received RF signals (either uplink or downlink), processes received data, then encodes, modulates, and transmits the data to a wireless device.

Figure 5:
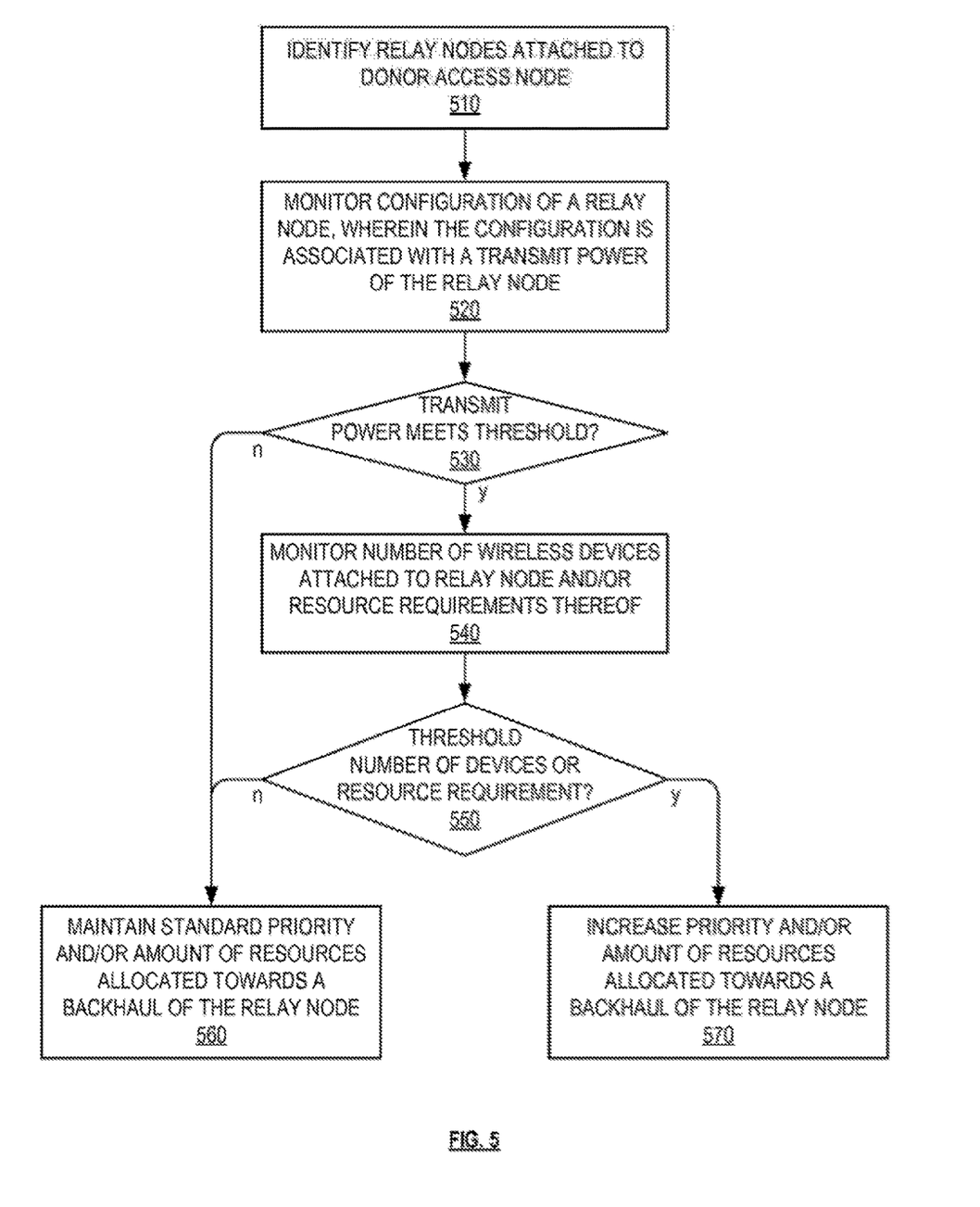
FIG. 5 depicts an exemplary method for scheduling resources for relay nodes in a wireless network.

FIG. 5 depicts an exemplary method for scheduling resources for relay nodes in a wireless network. The method of FIG. 5 may be implemented by a donor access node (such as donor access node 110, 210, 310), by a controller node (such as controller node 104), or by any other network node.

Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, relay nodes attached to a donor access node are identified. The relay node is configured to relay data packets between the donor access node and an end-user wireless device attached to the relay node. The relay node generally comprises a first component for communicating with the donor access node via a wireless backhaul connection (hereinafter, "backhaul") and a second component for deploying a wireless air-interface to which end-user wireless devices can attach and access network services from the donor access node. For example, the first component may comprise a relay wireless device and the second component may comprise a small-cell access node. The relay node may be identified upon the donor access node receiving an indication that the relay wireless device is configured to act as a relay. For instance, a short buffer status report or a device capabilities message may be configured to include an indicator of relay status.

At 520, a configuration associated with a transmit power of each relay node is monitored. Different relay nodes may be configured to deploy the respective wireless air interface using different transmit powers. For example, an access point of a first relay node may utilize a transmit power of approximately 40 W, whereas an access point of a second relay node may utilize a transmit power of approximately 20 W. Other configurations of access points are possible. The configuration of a relay node can further include a device capability of the first component of the relay node (e.g. the relay wireless device). For example, the relay wireless device may be assigned to a high power class, which enables additional bandwidth and range for the backhaul connection. The configuration of a relay node can further include a priority level. The priority level may be associated with the relay node (i.e. either one or both of the first component or the second component), or may be associated with the end-user wireless devices connected thereto. The priority level may further be associated with a bearer utilized by the relay wireless device or end-user wireless devices.

If, at 530, the transmit power of a relay node does not meet (or exceed) a threshold, then at 560 a standard priority and/or amount of resources allocated towards a backhaul of the relay node is maintained. The standard priority may be a priority level assigned to relay nodes in general, or may be a standard priority assigned to all wireless devices attached to the donor access node. Further, the standard amount of resources may comprise an amount of resources typically allocated for relay nodes, or may be capped at a maximum amount allocated towards the backhaul of all relay nodes attached to the donor access node.

However, if the transmit power does meet (or exceed) the threshold, then at 540 a monitoring process is initiated, whereby a number of end-user wireless devices (and/or a resource usage or requirement thereof) is monitored. In other words, dynamic resource prioritization is performed for backhaul connections of relay nodes that use a higher transmit power for its associated wireless air-interface. Monitoring 540 is performed continuously along with decision 550 of whether or not the number of end-user wireless devices attached to the relay node meets a threshold number, or whether or not a resource usage or requirement of said end-user wireless devices meets a threshold amount. If it is determined at 550 that the number or usage requirements of the end-user wireless devices does not rise to meet (or exceed) the associated thresholds, then at 560 a standard priority and/or amount of resources allocated towards a backhaul of the relay node is maintained. However, if the number or usage requirements of the end-user wireless devices meets a threshold number or amount, then at 570 the priority and/or amount of resources allocated towards the backhaul of the relay node is increased. In other words, resources are scheduled with higher priority on the backhaul connection of a high-powered relay node that is serving a threshold number of end-user wireless devices, or that is serving end-user wireless devices having resource requirements that meet or exceed a threshold amount.

In other exemplary embodiments, resources are scheduled with higher priority for high-powered relay nodes that are also serving high-priority end-user wireless devices or end-user wireless devices associated with a high-priority bearer. For example, priority of an end-user wireless device may be identified based on a type of data packet received from or addressed to the end-user wireless device, based on a unique identifier such as a DSCP value or a unique radio bearer such as a quality-of-service (QoS) class identifier (QCI) bearer. Bearer QCI values may be predefined within a wireless network, and known to a donor access node. Since QoS requirements (eg: a given delay budget or packet loss tolerance) for bearers are mapped to QCI values, the configuration of a backhaul for a high-powered relay node may be adjusted at 570 to meet the QoS requirements of end-user wireless devices connected to the high-powered relay node. Similarly, allocation and retention priority (ARP) is another QoS parameter comprising information about the priority level of a resource request from, for example, an end-user wireless device. The priority level defines the relative importance of a resource request, which enables determining whether a bearer establishment or modification request can be accepted or needs to be rejected in case of resource limitations, or to decide which existing bearers to pre-empt during resource limitations. An end-user wireless device that submits a bearer request with a high priority level via a relay node may trigger an adjustment at 570 for the backhaul connection of the relay node to match the priority of the end-user wireless device. On the other hand, a relay node that is configured to utilize a standard transmit power may not be capable of adequately serving high-priority end-user wireless devices and, thus, the backhaul thereof is assigned a standard or default priority at 560, irrespective of the requirements, numbers, or priorities of end-user wireless devices connected thereto.

Figure 6A:
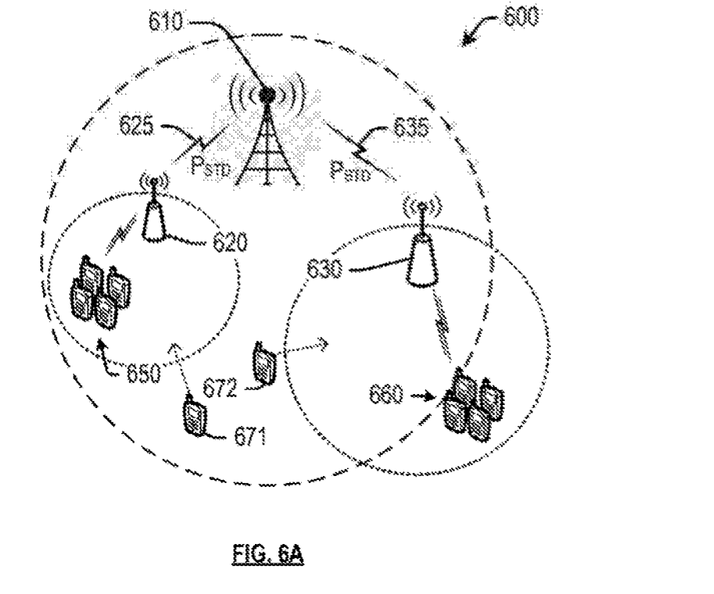
FIGS. 6A-6B depict exemplary systems for scheduling resources for relay nodes with different transmit powers.
Figure 6B:
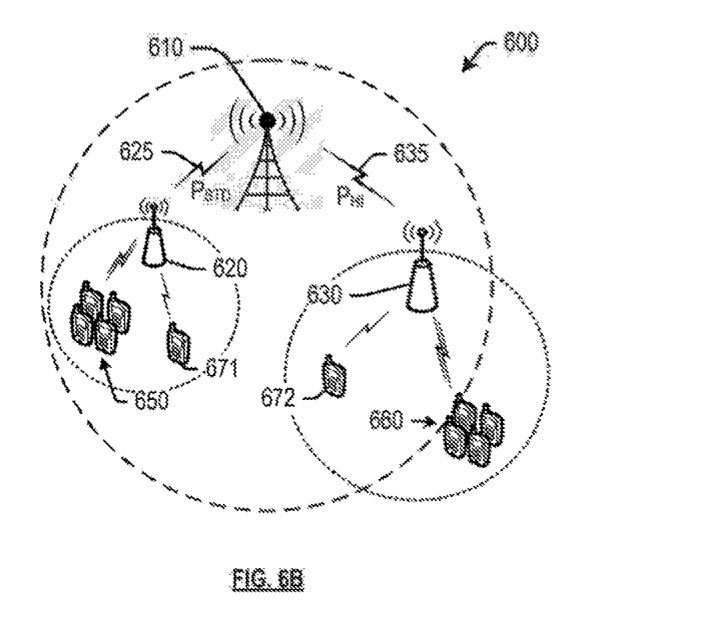

FIGS. 6A-6B depict an exemplary system 600 for scheduling resources for relay nodes with different transmit powers. System 600 comprises components similar to system 100, including access node 610, relay nodes 620 and 630, and end-user wireless devices 650 and 660. For example, access node 610 may be a macrocell access node similar to access node 110 and, similar to relay nodes 120, 130, each of relay nodes 620, 630 may be configured to communicate with access node 610 over backhaul communication links 625, 635 respectively and are further configured to deploy additional wireless air interfaces to which wireless devices 650, 660 can attach and gain access to network services from donor access node 610. Any other combination of donor access nodes, relay access nodes, and other system components (such as communication networks, gateways, controller nodes not depicted herein) may be evident to those having ordinary skill in the art in light of this disclosure.

Further, as described herein, resources are scheduled towards backhauls 625, 635 based on a configuration of each of relay nodes 620, 630 respectively. The configuration of each relay node 620, 630 may comprise a transmit power level used to deploy a wireless air interface of each relay node 620, 630. In this embodiment, relay node 630 is illustrated as utilizing a higher transmit power than relay node 620. Differences in the coverage area of differently-configured relay nodes can result in different bandwidth or throughput requirements associated with the respective backhaul of each relay node. Thus, operations performed by system 600 include scheduling resources towards each of backhauls 625, 635 based on the configuration of each relay node 620, 630 respectively.

For example, with reference to FIG. 6A, each of relay nodes 620 and 630 is serving a number of end-user wireless devices 650, 660 respectively. In this exemplary embodiment, a number of end-user wireless devices 650, 660 may be within a threshold number of end-user wireless devices, wherein the threshold is definable by an operator of system 600. Consequently, each of backhauls 625, 635 is assigned a standard (or default) priority PsTD. Further, wireless device 671 is illustrated as moving towards relay node 620, and wireless device 672 is illustrated as moving towards relay node 630. Subsequently, in FIG. 6B, each of wireless devices 671, 672 is illustrated as having moved within a coverage area of relay nodes 620, 630 respectively. In this exemplary embodiment, the presence of wireless device 671 attached to relay node 620 and of wireless device 672 attached to relay node 630 results in the number of end-user wireless devices attached to each relay node meeting or exceeding a threshold. As a result, a priority level of backhaul 635 of relay node 630 that uses the higher transmit power is increased to PHI, whereas the priority level of backhaul 625 of relay node 620 that uses the standard transmit power is maintained at PsTD, as described herein.

Figure 7A:
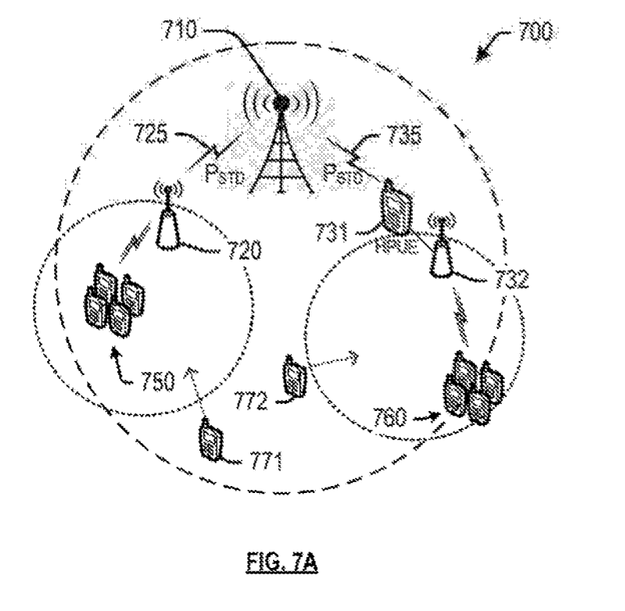
FIGS. 7A-7B depict exemplary systems for scheduling resources for relay nodes comprising high-powered wireless devices.
Figure 7B:
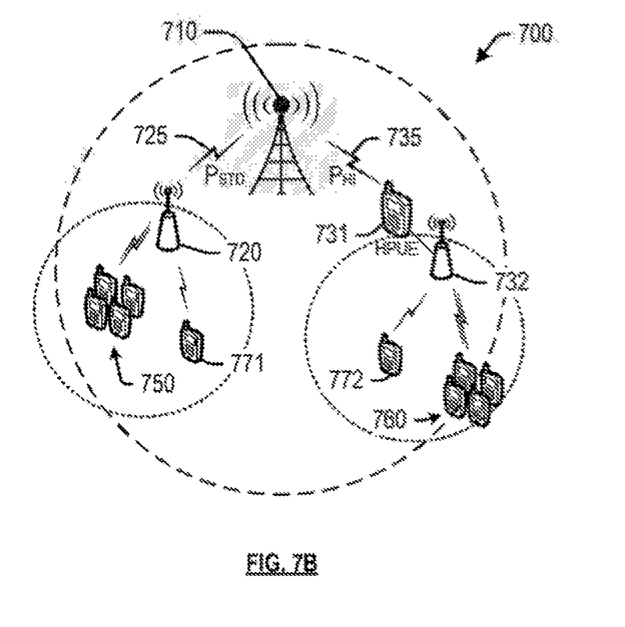

FIGS. 7A-7B depict exemplary systems for scheduling resources for relay nodes comprising high-powered wireless devices. System 700 comprises components similar to system 100, including access node 710, relay node 720, and end-user wireless devices 750 and 760. For example, access node 710 may be a macrocell access node similar to access node 110 and, similar to relay node 120, relay node 720 may be configured to communicate with access node 710 over backhaul communication links 725 and is further configured to deploy additional wireless air interfaces to which wireless devices 750 can attach and gain access to network services from donor access node 710. Further in this embodiment, an additional relay node comprises a relay wireless device 731 for communicating with donor access node 710 via backhaul 735 and a relay access point 732 for deploying a wireless air-interface to which end-user wireless devices 760 can attach and access network services from donor access node 710. Relay wireless device 731 and relay access point 732 may be considered as analogous to components 330 and 340 illustrated in FIG. 3. Further, any other combination of donor access nodes, relay access nodes, and other system components (such as communication networks, gateways, controller nodes not depicted herein) may be evident to those having ordinary skill in the art in light of this disclosure.

As described herein, resources are scheduled towards backhauls 725, 735 based on a configuration of each of relay node 720 and relay wireless device 731 respectively. In this embodiment, the configuration may be associated with relay wireless device 731 being assigned to a high power class. In other words, relay wireless device 731 may comprise a high-powered wireless device (HPUE), which in turn indicates that backhaul 735 can handle a greater amount of resources, or resources having higher priority. Consequently, a threshold number of end-user wireless devices attached to relay access point 732 may trigger an increase in priority of backhaul 735, whereas a threshold number of end-user wireless devices attached to relay node 720 would not trigger such an increased.

Specifically, with reference to FIG. 7A, each of backhauls 725, 735 is assigned a standard (or default) priority PSTD. Further, wireless device 771 is illustrated as moving towards relay node 720, and wireless device 772 is illustrated as moving towards relay access point 732. Subsequently, in FIG. 7B, each of wireless devices 771, 772 is illustrated as having moved within a coverage area of relay node 720 and relay access point 732 respectively. In this exemplary embodiment, the presence of wireless device 771 attached to relay node 720 and of wireless device 772 attached to relay access point 732 results in the number of end-user wireless devices attached to each relay node meeting or exceeding a threshold. As a result, a priority level of backhaul 735 of high-powered relay wireless device 731 is increased to PHI, whereas the priority level of backhaul 725 of relay node 720 that does not comprise a high-powered relay wireless device is maintained at PSTD.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, relay node 120, controller node 104, and/or network 101.

Figure 8:
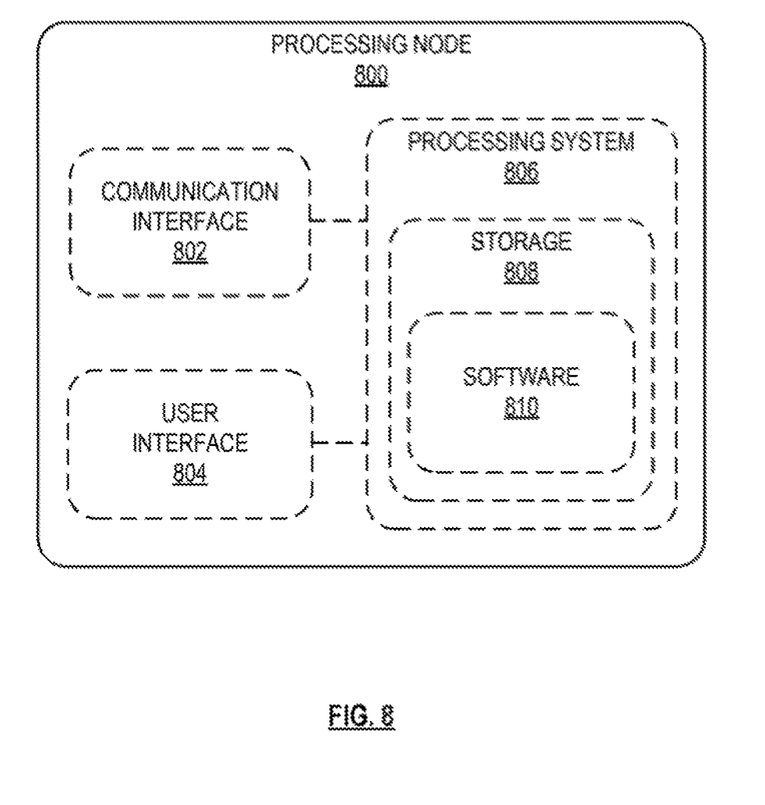
FIG. 8 depicts an exemplary processing node for scheduling resources for relay nodes in a wireless network.

FIG. 8 depicts an exemplary processing node for scheduling resources for relay nodes in a wireless network. Processing node 800 comprises a communication interface 802, user interface 804, and processing system 806 in communication with communication interface 802 and user interface 804. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. For example, storage 808 may include a buffer. Software 810 may include computer programs, firmware, or some other form of machine-readable instructions, including an operating system, utilities, drivers, network interfaces, applications, or some other type of software. For example, software 810 may include a module for performing transmission power control operations described herein. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and nonremovable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling resources for relay nodes in a wireless network, the method comprising:
   identifying a relay node attached to an access node in the wireless network;
   determining a transmit power associated with the relay node;
   scheduling resources for the relay node based on the transmit power satisfying a threshold transmit power level; and
   increasing the scheduled resources for the relay node based on the transmit power satisfying the threshold transmit power level.

2. The method of claim 1, wherein the relay node is prioritized for allocation of scheduled resources over one or more other relay nodes attached to the access node that do not satisfy the threshold transmit power level.

3. The method of claim 1, further comprising determining a priority level of the relay node.

4. The method of claim 3, wherein the scheduling resources is further based on the determined priority level.

5. The method of claim 1, wherein the transmit power comprises a transmit power of a radio air interface deployed by the relay node.

6. The method of claim 1, further comprising determining that the transmit power satisfies the threshold transmit power level.

7. The method of claim 1, further comprising determining that a number of end-user wireless devices attached to the relay node satisfies a threshold number.

8. The method of claim 7, wherein the scheduling resources is further based on a number of end-user wireless devices attached to the relay node satisfying the threshold number.

9. The method of claim 1, wherein the transmit power is based on a power class of the relay node.

10. The method of claim 9, wherein scheduling resources is further based on the power class of the relay node.

11. The method of claim 9, further comprising determining that the power class is a high power class.

12. The method of claim 11, wherein the relay node is prioritized over one or more other relay nodes that are not classified as high power relay nodes for allocation of scheduled resources.

13. The method of claim 1, wherein the scheduled resources comprise backhaul resources.

14. A method for scheduling resources for relay nodes in a wireless network, the method comprising:
    identifying a relay node attached to an access node in the wireless network;
    determining a transmit power associated with the relay node, wherein the transmit power is based on a power class of the relay node;
    determining that the power class of the relay node is a high power class, wherein the relay node is prioritized over one or more other relay nodes that are not classified as high power relay nodes for allocation of scheduled resources; and
    scheduling resources for the relay node based on the transmit power satisfying a threshold transmit power level.

15. The method of claim 14, wherein the relay node is prioritized for allocation of scheduled resources over one or more other relay nodes attached to the access node that do not satisfy the threshold transmit power level.

16. The method of claim 14, further comprising determining a priority level of the relay node.

17. The method of claim 16, wherein the scheduling resources is further based on the determined priority level.

18. The method of claim 17, wherein the transmit power comprises a transmit power of a radio air interface deployed by the relay node.

19. The method of claim 14, further comprising increasing the scheduled resources for the relay node based on the transmit power satisfying the threshold transmit power level.

20. The method of claim 14, further comprising determining that the transmit power satisfies the threshold transmit power level.

* * * * *